US009684566B2

(12) United States Patent
Li et al.

(10) Patent No.: US 9,684,566 B2
(45) Date of Patent: Jun. 20, 2017

(54) TECHNIQUES FOR BACKUP RESTORE AND RECOVERY OF A PLUGGABLE DATABASE

(71) Applicant: Oracle International Corporation, Redwood Shores, CA (US)

(72) Inventors: Yunrui Li, Fremont, CA (US); Chi Cao Minh, San Mateo, CA (US); Kumar Rajamani, San Ramon, CA (US); Jaebock Lee, Sunnyvale, CA (US); Sanket Jain, Sunnyvale, CA (US); Giridhar Ravipati, Foster City, CA (US); Jonghyun Lee, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 635 days.

(21) Appl. No.: 14/135,202

(22) Filed: Dec. 19, 2013

(65) Prior Publication Data
US 2014/0164331 A1    Jun. 12, 2014
US 2016/0210201 A9    Jul. 21, 2016

Related U.S. Application Data

(63) Continuation-in-part of application No. 13/631,815, filed on Sep. 28, 2012, now Pat. No. 9,239,763.
(Continued)

(51) Int. Cl.
G06F 17/30         (2006.01)
G06F 11/14         (2006.01)

(52) U.S. Cl.
CPC ...... *G06F 11/1469* (2013.01); *G06F 11/1471* (2013.01); *G06F 17/30289* (2013.01);
(Continued)

(58) Field of Classification Search
CPC ................................................ G06F 17/30289
See application file for complete search history.

(56) References Cited

U.S. PATENT DOCUMENTS 6,804,671 B1   10/2004  Loaiza et al.
7,822,717 B2   10/2010  Kappor et al.
(Continued)

OTHER PUBLICATIONS

DBA I, Practice-Control and Redo Log Files, Computer Science and Engineering Department, Nov. 1, 2009, http://andrei.clubcisco.ro/cursuri/5master/abd/4._Control_and_Redo_Log_Files.pdf.*
(Continued)

*Primary Examiner* — Apu Mofiz
*Assistant Examiner* — Cindy Nguyen
(74) *Attorney, Agent, or Firm* — Hickman Palermo Becker Bingham LLP (57) ABSTRACT

A container database stores redo records and logical timestamps for multiple pluggable databases. When it is detected that a first read-write instance of the pluggable database is opened and no other read-write instances of the pluggable database are open, offline range data associated with the pluggable database is updated. When it is detected that a second read-write instance of the pluggable database is closed, and the second read-write instance is the last open read-write instance, the offline range data associated with the pluggable database is updated. The pluggable database is restored to a logical timestamp associated with a restore request based on the offline range data.

20 Claims, 6 Drawing Sheets

Related U.S. Application Data (60) Provisional application No. 61/707,726, filed on Sep. 28, 2012.

(52) U.S. Cl.
CPC .... *G06F 17/30566* (2013.01); *G06F 11/1448* (2013.01); *G06F 2201/80* (2013.01); *G06F 2201/835* (2013.01)

(56) References Cited

U.S. PATENT DOCUMENTS

| | | | |
|---|---|---|---|
| 8,364,648 | B1 | 1/2013 | Sim-Tang |
| 2002/0112022 | A1 | 8/2002 | Kazar et al. |
| 2003/0061537 | A1 | 3/2003 | Cha et al. |
| 2004/0267809 | A1 | 12/2004 | East et al. |
| 2005/0038831 | A1 | 2/2005 | Souder et al. |
| 2007/0083563 | A1* | 4/2007 | Souder ............. G06F 17/30575 |
| 2007/0100912 | A1 | 5/2007 | Pareek et al. |
| 2007/0244918 | A1 | 10/2007 | Lee et al. |
| 2010/0318570 | A1 | 12/2010 | Narasinghanallur et al. |
| 2011/0004586 | A1 | 1/2011 | Cherryholmes et al. |
| 2011/0060724 | A1 | 3/2011 | Chan |
| 2011/0087633 | A1 | 4/2011 | Kreuder et al. |
| 2011/0307450 | A1* | 12/2011 | Hahn ............. G06F 17/30339 707/649 |
| 2012/0109926 | A1 | 5/2012 | Novik et al. |
| 2013/0117237 | A1 | 5/2013 | Thomsen et al. |
| 2013/0212068 | A1 | 8/2013 | Talius et al. |

OTHER PUBLICATIONS

Oracle7 Enterprise Backup Utility Administrators's Guide, Copyright 1997, Oracle Corporation.*
U.S. Appl. No. 13/631,815, filed Sep. 28, 2012, Office Action, May 29, 2014.
U.S. Appl. No. 13/841,272, filed Mar. 15, 2013, Restriction Requirement, Jan. 8, 2015.
U.S. Appl. No. 13/830,349, filed Mar. 14, 2013, Office Action, Nov. 5, 2014.
U.S. Appl. No. 13/631,815, filed Sep. 28, 2012, Office Action, Nov. 6, 2014.
U.S. Appl. No. 13/830,349, filed Mar. 14, 2013, Interview Summary, Mar. 9, 2015.
U.S. Appl. No. 13/631,815, filed Sep. 8, 2012, Notice of Allowance, Apr. 3, 2015.
U.S. Appl. No. 13/631,815, filed Sep. 28, 2012, Notice of Allowance, Aug. 20, 2015.
U.S. Appl. No. 13/830,349, filed Mar. 14, 2013, Notice of Allowance, Oct. 19, 2015.
U.S. Appl. No. 13/631,815, filed Sep. 28, 2012, Office Action, Dec. 23, 2013.
Rejeev Kumar et al., Oracle DBA, A Helping Hand, Container Database and Pluggable Database (CDB & PDB), retrieved from the internet on Dec. 4, 2013, 2 pages.
Preimesberger, Chris, "Oracle Profits Up, but Revenues Slip" Oracle, dated Sep. 20, 2012, 2 pages.
Dominic Betts et al., "Developing Multi-Tenant Applications for the Cloud," 3rd Edition, Microsoft, 2012, 246 pages.
U.S. Appl. No. 13/830,349, filed Mar. 14, 2013, Final Office Action, Jun. 2, 2015.
Muhammad Anwar, "How to Install Oracle 12c Multitenant Pluggable Database", Dated Feb. 24, 2012, 27 pages.

* cited by examiner

TECHNIQUES FOR BACKUP RESTORE AND RECOVERY OF A PLUGGABLE DATABASE

CROSS-REFERENCE TO RELATED APPLICATIONS

This application claims benefit as a continuation-in-part of U.S. patent application Ser. No. 13/631,815, filed Sep. 28, 2012, which claims benefit of U.S. Provisional Application No. 61/707,726, filed Sep. 28, 2012, the entire contents of which are hereby incorporated by reference as if fully set forth herein.

FIELD OF THE INVENTION

The present invention relates to database systems and, more specifically, to pluggable database systems.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Database consolidation involves distributing and sharing computer resources of a hardware platform among multiple databases. Important objectives of database consolidation include isolation, transportability, and fast provisioning. Isolation is the ability to limit an application's access to the appropriate database. Transportability is the ability to efficiently move databases between hosts. Fast provisioning is the ability to quickly deploy a database on a host.

In non-consolidated databases, database backup and recovery may be performed on a per-database basis. However, in a consolidated database or other in-database virtualizations capable of consolidating multiple databases, traditional database backup and recovery practices cannot be carried out on a per-database basis with the same behavior expected of a non-consolidated database.

For example, when a database is restored to a restore point from a database backup, the database backup is recovered, and redo records are processed from the time of the database backup to the restore point. Recovery time is roughly proportional to the time elapsed between the database backup and the restore point. In a non-consolidated database, the restore point typically corresponds to the point the non-consolidated database was closed or otherwise made inactive. The redo log of the non-consolidated database does not grow when the non-consolidated database is inactive. In a consolidated database environment that implements a shared redo log, the recovery time for a particular database may be unbounded since the redo log grows even when the specific pluggable database is inactive.

Discussed herein are approaches for database backup and recovery on a per-database basis in a consolidated database system.

DETAILED DESCRIPTION

In the following description, for the purpose of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are described herein for backup restore and recovery of pluggable databases in a container database.

Databases may be consolidated using a container database management system. The container database may manage multiple pluggable databases. In a container database management system, each pluggable database may be open or closed in the container database independently from other pluggable databases. The pluggable databases of a container database share a single set of redo records, which are maintained by the container database. The redo records correspond to all changes made to databases within the container database. The redo records are ordered in time using a shared logical clock service that assigns each redo record a logical timestamp.

A container database management system may be implemented as a shared-disk database. In a shared-disk database, multiple database instances, hereafter instances, may concurrently access a specific database, such as a container database and/or pluggable databases of the container database. A shared-disk database may use various backup restore and recovery techniques that take into account the existence of multiple instances that have access to the shared-disk database.

To facilitate backup restore and recovery of a pluggable database within a container database, the container database maintains a pluggable database status and offline range data for associated pluggable databases. The pluggable database status is "active" when at least one instance of the pluggable database is open in read-write mode. The pluggable database status is "clean" when no instances of the pluggable database are open in read-write mode. The offline range of a pluggable database indicates when the pluggable database was in a clean status with respect to the logical timestamp generated by the shared logical clock.

When a specific pluggable database is recovered based on a backup, the number of redo records that need to be processed is limited based on the pluggable database status and the offline range data. In this manner, backup restore and recovery of individual pluggable databases may be implemented using the same set of common backup restore and recovery techniques for a non-consolidated database, and the expected behavior for backup restore and recovery is achieved.

Container Database and Pluggable Database Architecture

A container database consisting of one or more pluggable databases provides in-database virtualization for consolidating multiple separate databases. To facilitate backup restore and recovery of individual pluggable databases of the container database, pluggable database status and offline range data for associated pluggable databases may be stored in components of the container database and/or the individual pluggable databases, as described in further detail below.

Figure 1:
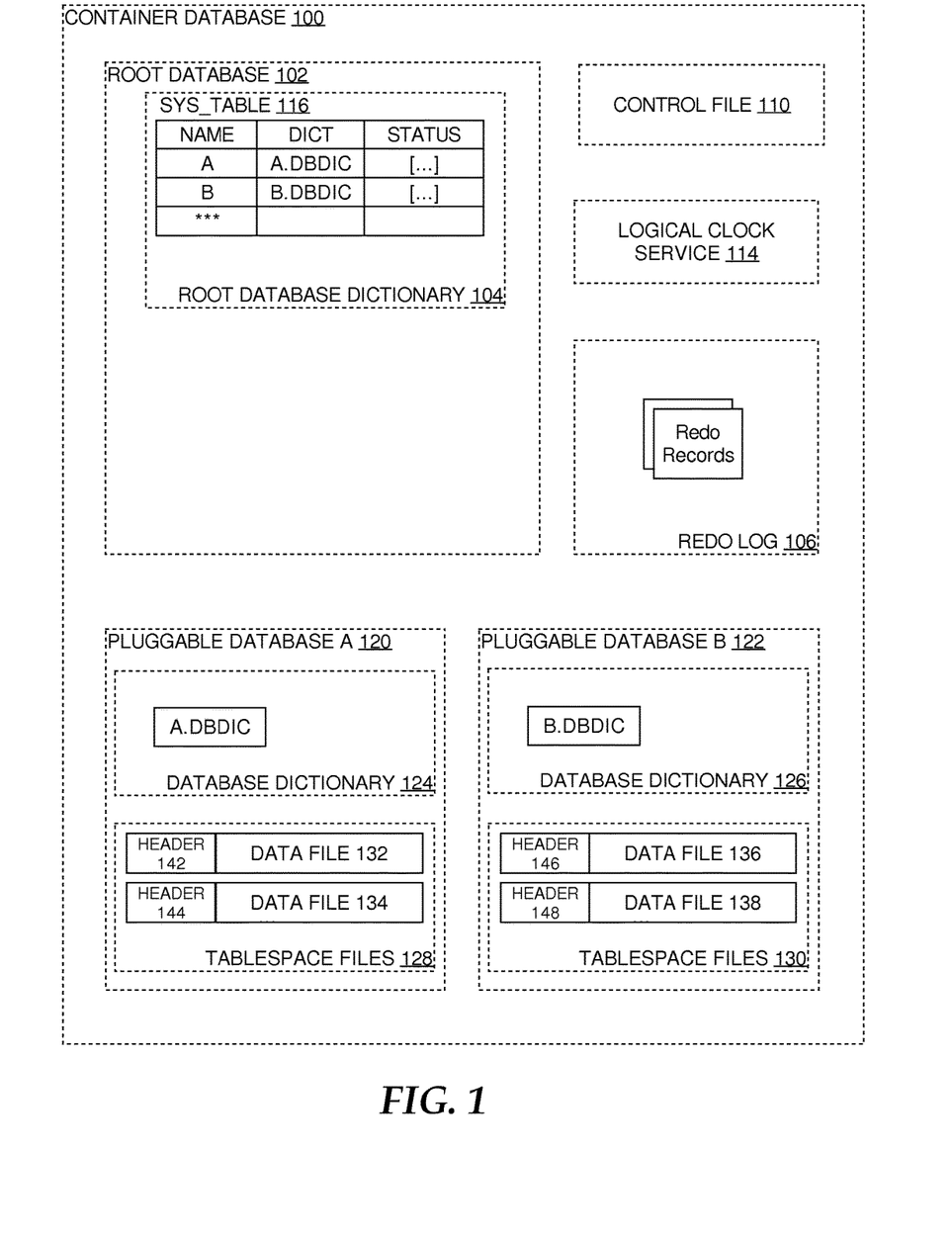
FIG. 1 is a block diagram depicting an embodiment of a container database and pluggable database elements.

FIG. 1 is a block diagram depicting an embodiment of a container database and pluggable database elements. Container database 100 contains multiple databases that are hosted and managed by a database server. The container database 100 includes one or more pluggable databases 120-122, and root database 102, which are described in greater detail below. A container database may contain more pluggable databases than the number of pluggable databases that are depicted in FIG. 1.

Pluggable databases may be "plugged in" to a container database, and may be transported between database servers and/or DBMSs. Container database 100 allows multiple pluggable databases to run on the same database server and/or database server instance, allowing the computing resources of a single database server or instance to be shared between multiple pluggable databases.

Container database 100 provides database isolation between its pluggable databases 120-122 such that users of a database session established for a pluggable database may only access or otherwise view database objects defined via the attached pluggable database dictionary corresponding to the user's database session. The isolation also extends to namespaces. Each pluggable database has its own namespace for more types of database objects. With respect to each pluggable database 120-122 in a container database 100 hosted on a database server, the name uniqueness requirement of tablespaces 128-130 and schemas is also only confined to individual pluggable databases 120-122. The respective tablespace files 128-130 and database dictionaries 124-126 may be moved between environments of container databases using readily available mechanisms for copying and moving files.

Root Database

Root database 102 is a database used to globally manage container database 100, and to store metadata and/or data for "common database objects" to manage access to pluggable databases 120-122.

A database dictionary contains metadata that defines database objects physically or logically contained in the database. A database dictionary is stored persistently (e.g. on disk). When a database server is running, the database dictionary may be loaded into one or more data structures in volatile memory ("in-memory data structures") that store at least a portion of metadata that is in the dictionary store.

The database dictionary corresponding to root database 102 is a root database dictionary 104. Root database 102 may also have its own tablespace files 112 in container database 100. Root database dictionary 104 defines common database objects that are shared by pluggable databases 120-122 in container database 100, such as data to administer container database 100 and pluggable databases 120-122. For example, root database 102 may include data that identifies pluggable databases that are plugged into container database 100. In one embodiment, SYS_TABLE 116 identifies a dictionary store that holds metadata for the associated pluggable database in a database dictionary. For example, SYS_TABLE 116 of root database dictionary 104 may identify each pluggable database 120-122 plugged into container database, the respective database dictionaries 124-126, and the respective pluggable database statuses.

Although root database 102 is illustrated as a separate database within container database 100, other architectural implementations for storing common database objects may be used.

Pluggable Database

A container database 100 may include one or more pluggable databases 120-122. Container database 100 is used to consolidate pluggable databases 120-122. Although pluggable databases 120-122 share resources, they may be accessed independently, as described in further detail below. In one embodiment, a user connected to a specific pluggable database is not exposed to the underlying structure utilized for database consolidation, and the specific pluggable database appears as an independent database system.

Pluggable database A 120 includes database dictionary 124. Database dictionary 124 defines database objects physically or logically contained in pluggable database A 120. When pluggable database A 120 is open, database dictionary 124 may be loaded in-memory. Metadata of root database dictionary 104 is also stored persistently, such as in file A.DBDIC.

Pluggable database B 122 includes database dictionary 126. Database dictionary 126 defines database objects physically or logically contained in pluggable database B 122. When pluggable database B 122 is open, database dictionary 126 may be loaded in-memory. Metadata of database dictionary B 106 is also stored persistently, such as in file B.DBDIC.

A database dictionary of the pluggable database may be referred to herein as a pluggable database dictionary. A database object defined by a pluggable database dictionary that is not a common database object (e.g. not shared in container database 100) is referred to herein as a pluggable database object. A pluggable database object is defined in a pluggable database dictionary, such as database dictionary 124, and is only available to the associated pluggable database.

Data for pluggable database objects are stored in the corresponding tablespace files (e.g. tablespace files 128 for pluggable database A 120 and tablespace files 130 for pluggable database B 122). Tablespace files may include one or more data files 132-138. In one embodiment, one data file is stored for each tablespace of a pluggable database. Each data file 132-138 may include a header 142-148 comprising metadata for a corresponding data file. Metadata corresponding to data files 132-138 may also be otherwise stored.

A database session comprises a particular connection established for a client to a database server, such as a database instance, through which the client issues a series of database requests. A pluggable database dictionary is established for a database session by a database server in response to a connection request from the user for the pluggable database. Establishing the pluggable database dictionary as a database dictionary for a database session may be referred to herein as attaching the database dictionary. With respect to the pluggable database objects in the one or more pluggable databases of a container database, execution of database commands issued to a database session attached to a pluggable database dictionary can only access pluggable database objects that are defined by the pluggable database dictionary.

For example, in response to a connection request for access to pluggable database A 120, database dictionary 124 is attached to the database session. Database commands issued in the database session are executed against database dictionary 124. Access to pluggable database objects, such as through DML commands issued in the database session, is isolated to pluggable database objects defined by database dictionary 124. Container database 100 may handle multiple concurrently executing database sessions in this manner. In one embodiment, container database 100 provides in-database virtualization such that the consolidated database architecture is not transparent to the user of the database session.

Pluggable Database Status

To facilitate backup restore and recovery, a pluggable database status and offline range data is maintained for pluggable databases associated with a container database. The pluggable database status is "active" when at least one instance of the pluggable databases is open in read-write mode. The pluggable database status is "clean" when no instances of the pluggable database are open in read-write mode. In one embodiment, when the pluggable database status is "clean", the corresponding data files of the pluggable database includes all changes made in the database, i.e. all the changes in memory are flushed to the pluggable database's data files by the corresponding container database.

For each pluggable database 120-122 of container database 100, the pluggable database status is maintained by container database 100. The pluggable database status may also include a logical timestamp associated with the most recent status change, or the logical timestamp associated therewith may be otherwise stored. In one embodiment, the pluggable database status and the logical timestamp associated with the corresponding status change are stored in the data dictionary of the container database, such as root data dictionary 104. The pluggable database status and the corresponding logical timestamp may be stored persistently.

Offline Range Data

The offline range of a pluggable database indicates when the pluggable database status was "clean" with respect to the shared logical clock. Offline range data may include a complete offline range history or a portion thereof.

The offline range of a pluggable database indicates when the pluggable database status was "clean" with respect to shared logical timestamps of the container database, such as logical timestamps generated by shared logical clock service 114 of container database 100. Offline range data may include a complete offline range history or a portion thereof. For example, a backup control file may include an incomplete offline range history if the pluggable database status changes after the backup is generated.

The offline range data may be stored in the control file of the container database, such as control file 110. Alternatively and/or in addition, the offline range data may also be stored in a data file header (e.g., data file headers 142-144 for pluggable database A 120, or data file headers 146-148 for pluggable database B 122), or other metadata files of container database 100 or the respective pluggable database.

In one embodiment, the pluggable database status and the logical timestamp associated with the corresponding status change are stored in root data dictionary 104, while the offline range data is stored in control file 110. In cases where the root data dictionary 104 is not accessible, such as when backup restore and recovery is performed for the entire consolidated database, the information may be obtained from control file 110.

Redo Records

Container database 100 includes redo log 106. Redo log 106 includes one or more files that store all changes made to the database as they occur, including changes to pluggable databases 120-122. In one embodiment, before database changes are written to file, such as data files 132-138, these changes are first recorded in redo log 106. If a data file needs to be restored, a backup of the data file can be loaded, and redo records of redo log 106 may be applied, or replayed. The offline ranges contained in the offline range data correspond to periods when the pluggable database is not open in read-write mode. Based on one or more offline ranges contained in the offline range data for a specific pluggable database, a portion of the redo records of redo log 106 may be skipped when a backup restore and recovery procedure is performed for one or more data files of the specific pluggable database. In the case of a pluggable database crash, the recovery process has to apply all transactions, both uncommitted as well as committed, to a backup of the corresponding data files on disk using redo log files 106.

Within container database 100, redo log 106 is shared between the databases of container database 100, including pluggable databases 120-122 and root database 102. In a multi-instance database, each database instance may have an associated redo log 106.

Redo log 106 stores data and/or metadata ("redo records") related to modifications performed on container database 100, including any modifications performed on any pluggable databases 120-122 that are plugged into container database 100. Redo log 106 includes data usable to reconstruct all changes made to container database 100 and databases contained therein. For example, a redo record may specify one or more data block(s) being modified and their respective values before and after each database change.

Redo records may also include logical timestamp data that identifies an order in which the corresponding changes were made. For example, each redo record may be associated with a logical timestamp generated by logical clock service 114. As used herein, the term "logical timestamp" includes any data usable to uniquely identify an order between any two logical timestamps. Container database 100 includes a single logical clock service 114 that generates logical timestamps for all databases in container database 100, including pluggable databases 120-122. The logical timestamps may be used to identify an order in which the corresponding database changes were made across all pluggable database instances within container database 100. The logical timestamps may be based on an actual system time, a counter, or any other data that may be used to identify order. For example, the logical timestamp associated with each redo record may be a System Change Number ("SCN"). In one embodiment, for each change to container database 100, the corresponding redo record includes the current logical timestamp. This produces a stream of redo changes in logical timestamp order. In a multi-instance database environment, such as Oracle Real Application Clusters ("RAC"), the logical timestamp may be propagated across database instances.

When redo log 106 includes a plurality of ordered redo records, the redo records may be considered a stream of redo records, or a redo stream. An associated database server may use the redo stream to replay modifications to container database 100, such as when a recovery is required, as will be discussed in more detail below.

When the pluggable database status changes, a status change redo record, corresponding to the pluggable database status change may also be generated. The status change redo record may be useful in cases such as, but not limited to: database crashes and failures, pluggable database replication on a standby or secondary system, and redundant storage of critical data within the container database system.

At a checkpoint, buffers are written to data files. Checkpoints are implemented in a variety of situations, such as, but not limited to: database shutdown, redo log changes, incrementally, and tablespace operations. In one embodiment, when the pluggable database status becomes clean after closing any instances that was open in read-write mode, all data files specific to the pluggable database are checkpointed. Furthermore, the data files of the pluggable database may be closed such that the pluggable database may be restored and recovered freely without worrying about interference from other instances of the pluggable database.

Control File

Container database 100 includes control file 110. A control file keeps track of database status and records the physical structure of the database. For example, a control file may include a database name, names and locations of associated data files, logical timestamp information associated with the creation of the database, a current logical timestamp for the database, and checkpoint information for the database. At least one control file 110 is created and available for writing when container database 100 is open. Within container database 100, control file 110 is shared between the databases of container database 100, including pluggable databases 120-122 and root database 102. In one embodiment, control file 110 includes the pluggable database status and/or offline range data associated with each pluggable database 120-122 within container database 100.

Database Restore and Recovery

Figure 2A:
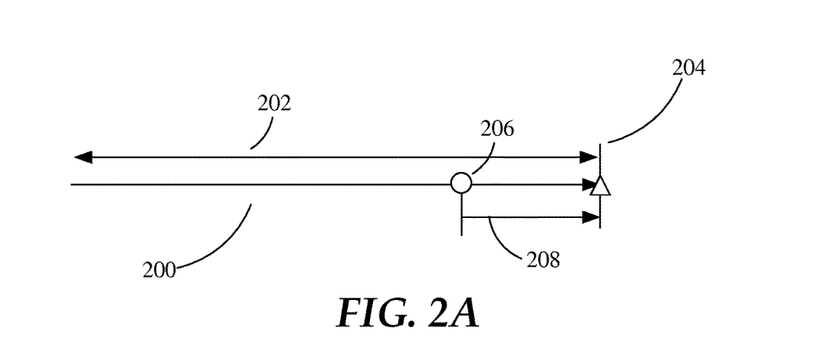
FIG. 2A is a diagram depicting non-consolidated database backup, according to an embodiment.

FIG. 2A is a diagram depicting non-consolidated database backup, according to an embodiment. A redo log of the non-consolidated database is represented as redo stream 200. Redo stream 200 is illustrated as a timeline of redo records in logical timestamp order. In a non-consolidated database, the logical clock service that generates logical timestamps is only running when the database is open. If the database is closed on all database instances, then no redo records are generated. The non-consolidated database is open during range 202. Restore point 204 is a logical timestamp corresponding to a desired restore point of the non-consolidated database. Backup point 206 is a logical timestamp corresponding to a point at which a backup was taken of data files corresponding to the non-consolidated database. To recover the non-consolidated database to restore point 204 based on the backup of data files taken at backup point 206, the data files associated with backup point 206 are restored in the non-consolidated database, and redo records with logical timestamps within range 208 are applied. Range 208 includes logical timestamps between backup point 206 and restore point 204 when the non-consolidated database was open.

Figure 2B:
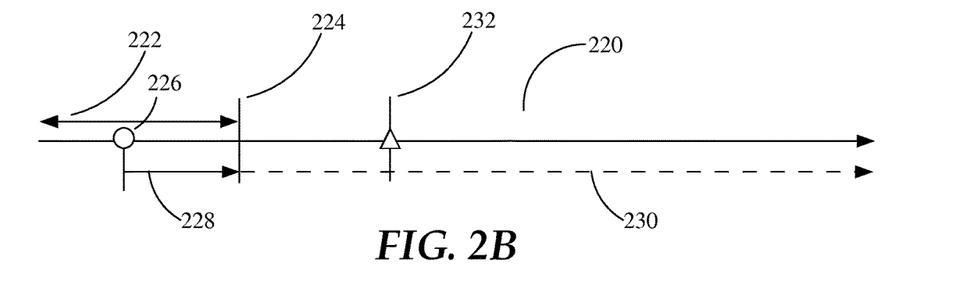
FIG. 2B is a diagram depicting pluggable database backup with respect to redo logs that include an offline period, according to an embodiment.

FIG. 2B is a diagram depicting pluggable database backup, according to an embodiment. A redo log of a container database associated with the pluggable database is represented as redo stream 220. Redo stream 220 is illustrated as a timeline of redo records, for all databases within the container database, in logical timestamp order. The pluggable database status is "active" during range 222. Restore point 232 is the logical timestamp corresponding to a desired restore point of the pluggable database. Backup point 226 is a logical timestamp corresponding to the point at which a backup was taken of data files corresponding to the pluggable database. The backup data files may be from an individual pluggable database backup or a container database backup. To recover the pluggable database to restore point 232 based on the backup of data files taken at backup point 226, the data files associated with backup point 226 are restored. Redo records with logical timestamps within range 228 are processed and applied if the changes contained therein are relevant to the pluggable database. Range 228 includes logical timestamps between backup point 226 and restore point 232 where the pluggable database status was also "active". Redo records with logical timestamps in an offline period 230 of the pluggable database do not need to be applied because the pluggable database status was clean. The offline data range for the pluggable database includes range 230. Because redo records with logical timestamps between point 224 and restore point 232 are within an offline period 230 of the pluggable database, these redo records do not need to be applied.

Figure 2C:
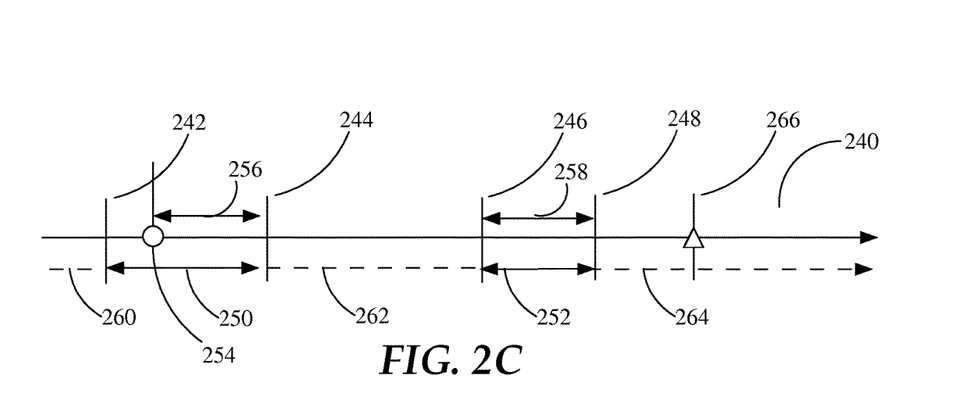
FIG. 2C is a diagram depicting pluggable database backup with respect to redo logs that include multiple offline periods of the pluggable database, according to an embodiment.

FIG. 2C is a diagram depicting pluggable database backup with respect to redo logs for a container database. The redo logs for the container database includes redo records for the pluggable database. A redo log of a container database associated with the pluggable database is represented as redo stream 240. Redo stream 240 is illustrated as a timeline of redo records for all databases within the container database, in logical timestamp order. The pluggable database status is active during ranges 250 and 252. The pluggable database status is clean during ranges 260, 262 and 264. Restore point 266 is the logical timestamp corresponding to a desired restore point of the pluggable database. Backup point 254 is a logical timestamp corresponding to the point at which a backup was taken of data files corresponding to the pluggable database. The backup data files may be from an individual pluggable database backup or a container database backup. To recover the pluggable database to restore point 266 based on the backup of data files taken at backup point 254, the data files associated with backup point 254 are restored in the container database. Redo records of logical timestamps within ranges 256 and 258 are processed and applied if the changes refer to the pluggable database. Ranges 256-258 include logical timestamps between backup point 254 and restore point 266 where the pluggable database status is active. Redo records with logical timestamps in an offline period 260, 262 and 264 of the pluggable database do not need to be applied because the pluggable database status was clean (i.e. no instance of the pluggable database was open in read-write mode, meaning no changes were made to the pluggable database). The offline data range for the pluggable database includes ranges 260, 262 and 264.

Use of Status Change Redo Records when Offline Data Range is Incomplete

In one embodiment, the entire offline data range may not be available or current. For example, in the case of media failure, the control file may be lost and a backup control file is restored, and information in the backup control file may be incomplete. In such cases, a pluggable database status (e.g. a pluggable database status stored in the data dictionary of the container database) may be compared to the offline data range in a backup file (e.g. in the container database control file) to determine if the backup file contains a current version of the offline data range. For example, when this pluggable database status includes the logical timestamp of the last status change, the logical timestamp may be used to determine whether an offline data range is current.

In one embodiment, if the offline data range is not current, such as in the control file or in a data file header, redo records from one or more offline periods of the pluggable database may be replayed. In this case, when a status change redo record is encountered, the outdated offline data range (e.g. in the control file, data file header, or other location) may be updated as the redo records are processed and/or applied. Other actions may be taken based on the redo records from one or more offline periods to model non-consolidated database behavior. For example, in one embodiment, when a status change redo record is replayed that corresponds to a change to the clean status, the data files corresponding to the pluggable database may be check pointed if data file backups were also restored before recovery.

Opening a Pluggable Database

Figure 3:
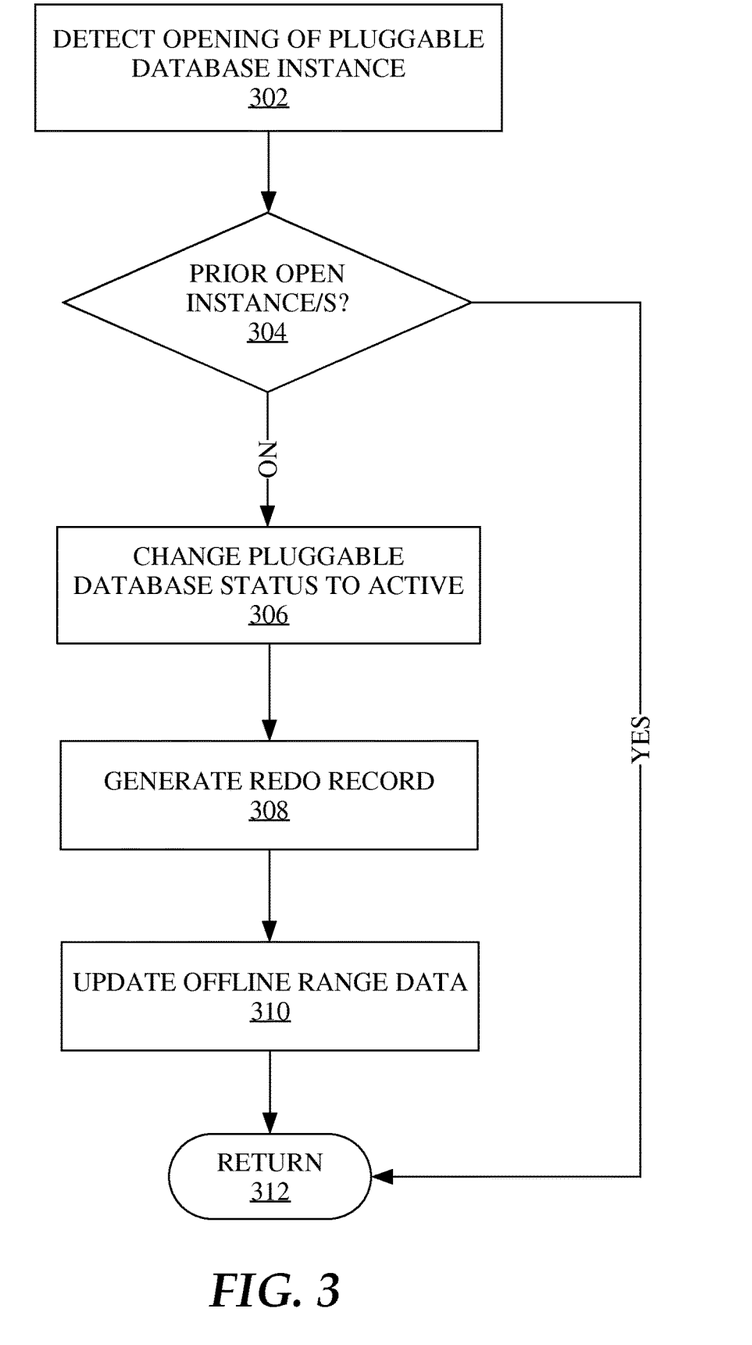
FIG. 3 is a flowchart illustrating an embodiment of a method for bringing a pluggable database to an active status.

FIG. 3 is a flowchart illustrating an embodiment of a method for detecting a pluggable database status change to an active status. The method may be performed by a process associated with a container database, such as container database 100.

At block 302, the opening of a pluggable database instance is detected.

Processing continues to decision block 304, where it is detected whether any other instance of the pluggable database is open. If it is determined that at least one prior instance of the pluggable database is open, no pluggable database status change is required, and processing continues to block 312, where the method returns and/or terminates. If no pluggable database status change is required, processing may continue to processing another database operation, passing control to a calling process, generating any appropriate record or notification, returning after a method or function invocation, or terminating.

Returning to decision block 304, if it is determined that there are no prior instances of the pluggable database open, processing continues to block 306, where a pluggable database status is changed to "active". The pluggable database status is maintained by the corresponding container database. For example, the pluggable database status change may be recorded in root data dictionary 104 of container database 100. In one embodiment, a pluggable database status maintained by a container database includes a logical timestamp indicating when the corresponding pluggable database status change occurred. For example, root data dictionary 104 may include pluggable database status information for pluggable database A 120 indicating that the pluggable database status change to "active" at a specific logical timestamp.

Processing continues to block 308, where a redo record is generated. The redo record indicates that the pluggable database status of the corresponding pluggable database is changed to an active pluggable database status at a corresponding logical timestamp. The redo record may be added to the redo log 106 of container database 100.

Processing continues to block 310, where offline range data associated with the corresponding pluggable database is updated. When a specific pluggable database status becomes "active", the offline range data should indicate that the specific pluggable database was offline from a previous pluggable database status change until the current pluggable database status change. In one embodiment, offline range data is stored and updated in control file 110 of container database 100. Alternatively and/or in addition, offline range data may be stored and updated in file headers or other metadata associated with data files of the specific pluggable database. For example, when pluggable database A 120 changes to an active pluggable database status, both control file 110 and headers 142-144 may be updated.

Processing continues to block 312, where the method returns and/or terminates. For example, processing may continue to processing another database operation, passing control to a calling process, generating any appropriate record or notification, returning after a method or function invocation, or terminating.

Closing a Pluggable Database

Figure 4:
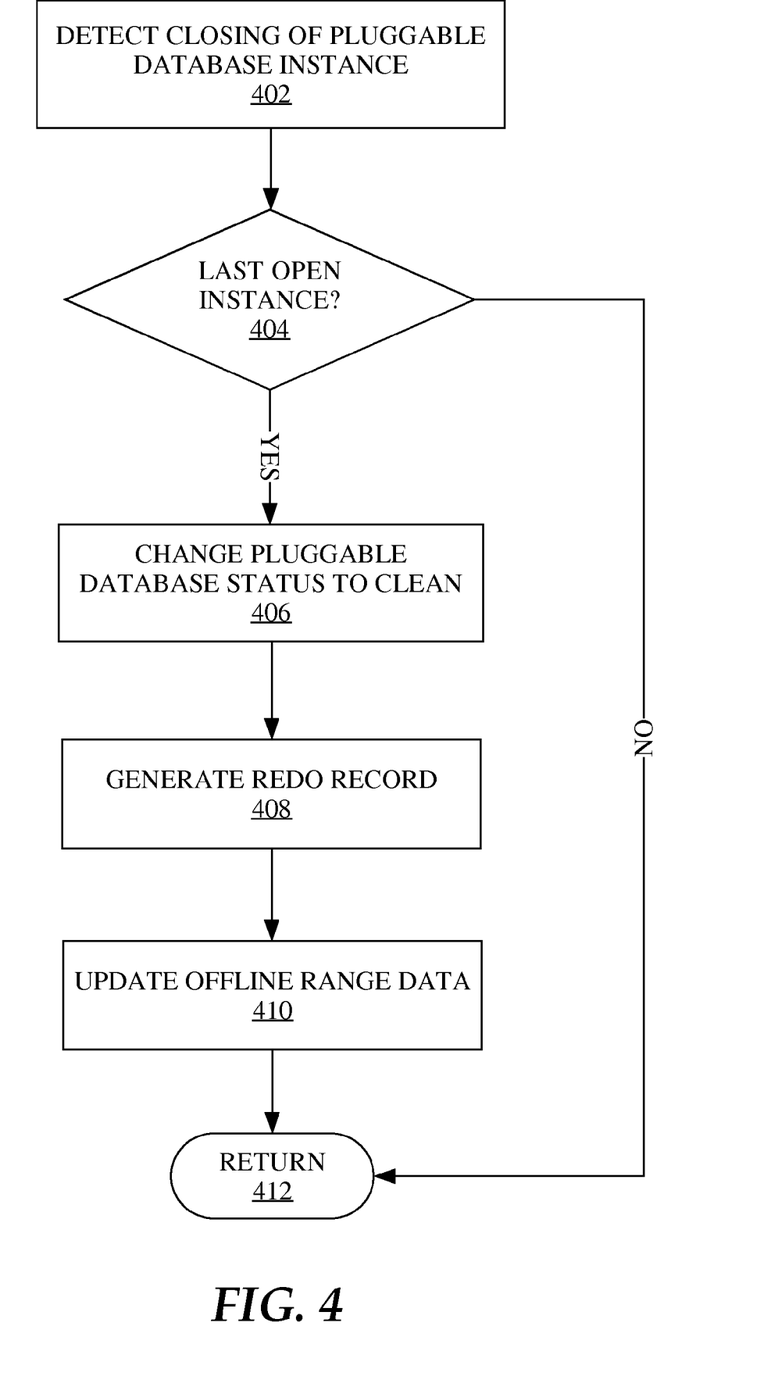
FIG. 4 is a flowchart illustrating an embodiment of a method for bringing a pluggable database to a clean status.

FIG. 4 is a flowchart illustrating an embodiment of a method for detecting a pluggable database status change to a clean status. The method may be performed, by a process associated with a container database, such as container database 100.

At block 402, the closing of a specific pluggable database instance is detected. For example, the specific pluggable database instance is closed in normal operation. In one embodiment, when the closing of a specific pluggable database instance is an abnormal termination, and the method described in FIG. 4 is performed by one or more surviving instances.

Processing continues to decision block 404, where it is detected whether the specific pluggable database instance is the last open instance of the corresponding pluggable database. If it is determined that the specific pluggable database instance is not the last open instance, no status change is required, and processing continues to block 412, where the method returns and/or terminates. For example, if no status change is required, processing may continue to processing another database operation, passing control to a calling process, generating any appropriate record or notification, returning after a method or function invocation, or terminating.

Returning to decision block 404, if it is determined that the specific pluggable database instance is the last open instance of the corresponding pluggable database, processing continues to block 406, where a pluggable database status is changed to "clean". The pluggable database status is maintained by the corresponding container database. For example, the status change may be recorded in root data dictionary 104 of container database 100. In one embodiment, a pluggable database status maintained by a container database includes a logical timestamp indicating when the corresponding status change occurred. For example, root data dictionary 104 may include status information for pluggable database A 120 indicating that the status change to "clean" at a specific logical timestamp.

Processing continues to block 408, where a redo record is generated. The redo record indicates that the status of the corresponding pluggable database status is changed to "clean" at a corresponding logical timestamp. The redo record may be added to the redo log 106 of container database 100.

Processing continues to block 410, where offline range data associated with the corresponding pluggable database is updated. When a specific pluggable database status changes to "clean", the offline range data should indicate that the specific pluggable database is offline as of this status change. In one embodiment, offline range data is stored and updated in control file 110 of container database 100.

Processing continues to block 412, where the method returns and/or terminates. For example, processing may continue to process another database operation, passing control to a calling process, generating any appropriate record or notification, returning after a method or function invocation, or terminating. In one embodiment, when after a pluggable database is transitioned to a clean status, such as by the method of FIG. 4, all data files associated with the pluggable database are checkpointed, and the data files will be closed on all database instances.

Restoring a Pluggable Database

Figure 5:
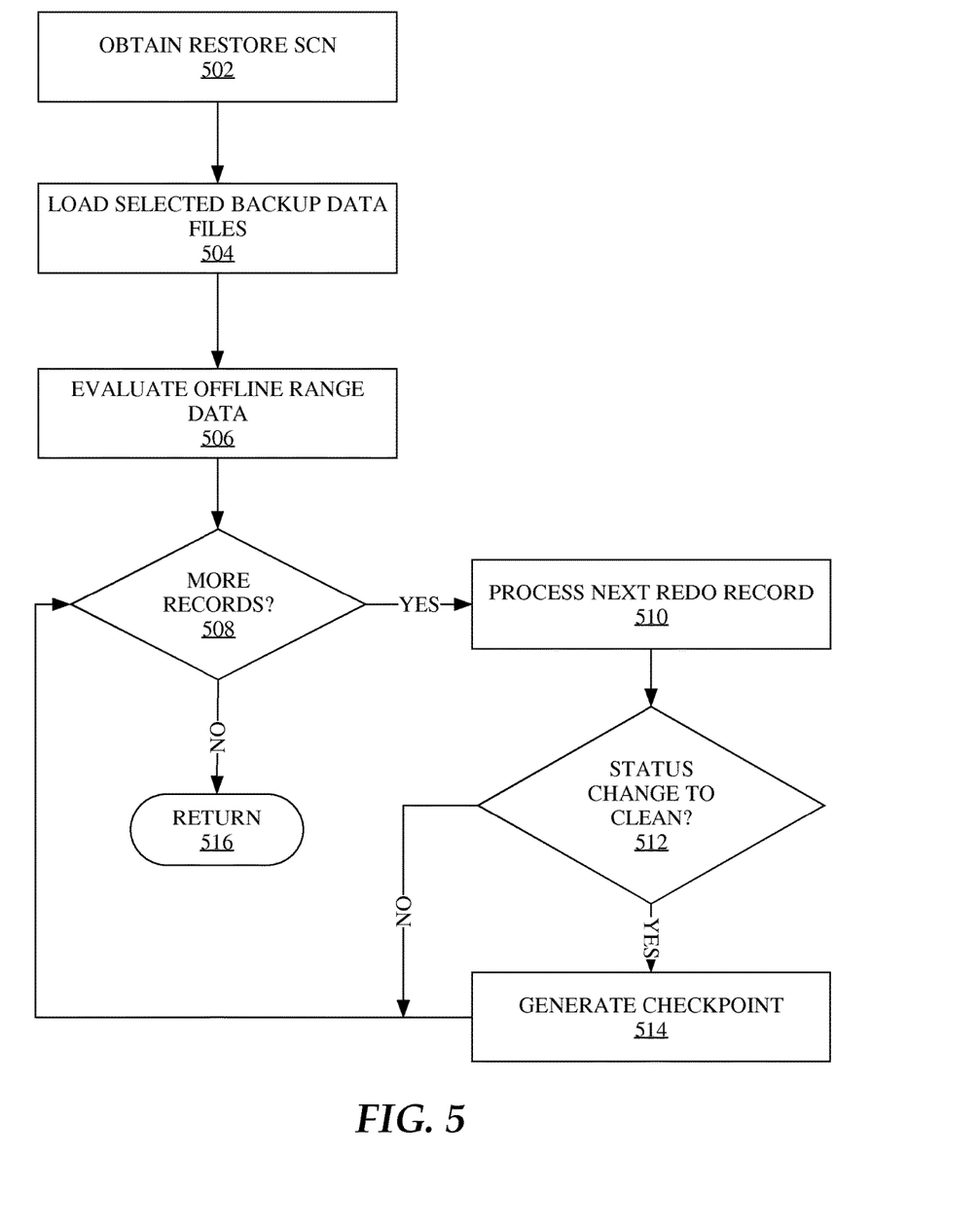
FIG. 5 is a flowchart illustrating an embodiment of a method for restoring a pluggable database.

FIG. 5 is a flowchart illustrating an embodiment of a method for restoring a pluggable database. The method may be performed by a process associated with a container database, such as container database 100. At block 502, a restore logical timestamp, such as an SCN, is obtained. An individual pluggable database will be restored to a logical time associated with the logical timestamp.

Processing continues to block 504, where backup data files are loaded and restored for the pluggable database. For example, the backup data files may be selected based on a backup of the individual pluggable database or a backup of the container database, where the backup is associated with a logical timestamp.

Processing continues to block 506, where offline range data corresponding to the pluggable database is evaluated. For example, offline range data may be stored in the control file of the container database and/or one or more header files of the data files of the pluggable database. In one embodiment, the data dictionary of the container database includes a pluggable database status. The pluggable database status may include a logical timestamp of the last status change of the pluggable database. The offline range data is evaluated to determine redo records that need to be processed. Redo records between the backup point and the restore point are processed unless they fall within an offline range of the pluggable database.

Processing continues to decision block 508, where it is determined if more redo records of the container database remain to be processed. If more redo records remain to be processed, processing continues to block 510, where the next redo record of the container database is processed and/or applied. A redo record of the container database may contain redo records for other pluggable databases in addition to redo records for the current pluggable database. In one embodiment, the redo record is processed by determining whether the change contained therein is relevant to the current pluggable database, in which case the redo record is applied.

Processing continues to decision block 512, where it is determined whether the current redo record indicates a pluggable database status change to "clean". If the redo record indicates a pluggable database status change to "clean", processing continues to step 514, where a checkpoint is generated. Otherwise, processing returns to decision block 508. In one embodiment, the checkpoint is generated when the pluggable database status changes to clean to emulate non-consolidated database behavior when a non-consolidated database is closed.

Returning to decision block 508, if it is determined that no more redo records remain to be processed, processing continues to block 516, where the method returns and/or terminates. For example, processing may continue to process another database operation, passing control to a calling process, generating any appropriate record or notification, returning after a method or function invocation, or terminating.

Database Systems

Embodiments of the present invention are used in the context of database management systems (DBMSs). Therefore, a description of a DBMS is useful. A DBMS manages a database. A DBMS may comprise one or more database servers. A database comprises database data and a database dictionary that are stored on a persistent memory mechanism, such as a set of hard disks. Database data may be stored in one or more data containers. Each container contains records. The data within each record is organized into one or more fields. In relational DBMSs, the data containers are referred to as tables, the records are referred to as rows, and the fields are referred to as columns. In object-oriented databases, the data containers are referred to as object classes, the records are referred to as objects, and the fields are referred to as attributes. Other database architectures may use other terminology.

Users interact with a database server of a DBMS by submitting to the database server commands that cause the database server to perform operations on data stored in a database. A user may be one or more applications running on a client computer that interact with a database server. Multiple users may also be referred to herein collectively as a user.

A database command may be in the form of a database statement that conforms to a database language. A database language for expressing the database commands is the Structured Query Language (SQL). There are many different versions of SQL, some versions are standard and some proprietary, and there are a variety of extensions. Data definition language ("DDL") commands are issued to a DBMS to create or configure database objects, such as tables, views, or complex data types. SQL/XML is a common extension of SQL used when manipulating XML data in an object-relational database. Data manipulation language ("DML") instructions are issued to a DBMS to manage data stored within a database structure. For instance, SELECT, INSERT, UPDATE, and DELETE are common examples of DML instructions found in some SQL implementations.

A multi-node database management system is made up of interconnected nodes that share access to the same database. Typically, the nodes are interconnected via a network and share access, in varying degrees, to shared storage, e.g. shared access to a set of disk drives and data blocks stored thereon. The nodes in a multi-node database system may be in the form of a group of computers (e.g. work stations, personal computers) that are interconnected via a network. Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of resources from a node is a server that is referred to herein as a "server instance" or "instance". A database server may comprise multiple database instances, some or all of which are running on separate computers, including separate server blades.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
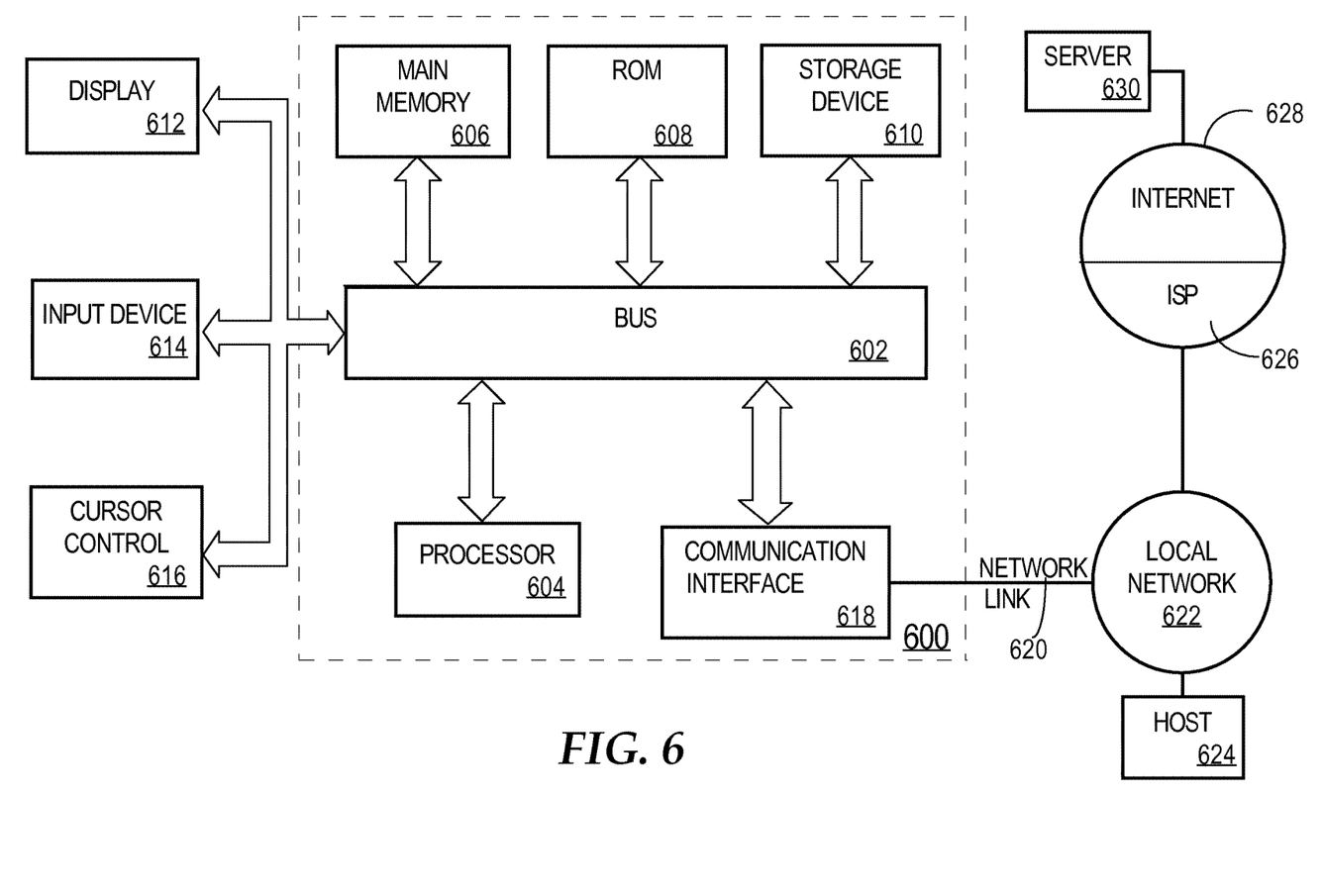
FIG. 6 is a flowchart illustrates a computer system upon which one or more embodiments may be implemented.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid status drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid status drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
    storing, by a container database, redo records for multiple particular pluggable databases, wherein the multiple pluggable databases include a particular pluggable database;
    in response to detecting that a first read-write instance of the particular pluggable database is opened and that no other read-write instances of the particular pluggable database are open, updating offline range data associated with the particular pluggable database to indicate that the particular pluggable database becomes active at a first logical timestamp;
    in response to detecting that a second read-write instance of the particular pluggable database is closed and that the second read-write instance was a last open read-write instance of the particular pluggable database, updating the offline range data associated with the particular pluggable database to indicate that the particular pluggable database becomes inactive at a second logical timestamp;
    restoring the particular pluggable database to a restore point based on redo records stored by the container database that are associated with a logical timestamp outside of one or more offline ranges indicated by the offline range data; and
    wherein the method is performed by one or more computing devices.

2. The method of claim 1, wherein restoring the particular pluggable database to the restore point comprises:
    loading at least one backup data file associated with the particular pluggable database; and
    processing at least one redo record associated with a logical timestamp in a range between a backup point associated with the at least one backup data file and the restore point, wherein redo records associated with a logical timestamp falling within an offline range indicated by the offline range data are not processed.

3. The method of claim 1, wherein the offline range data associated with the particular pluggable database is stored in a control file of the container database.

4. The method of claim 1, wherein the offline range data associated with the particular pluggable database is stored in file header data or other metadata for at least one data file associated with the particular pluggable database.

5. The method of claim 1,
    wherein the second read-write instance of the particular pluggable database is closed abnormally; and
    wherein at least one other instance of the particular pluggable database performs:
        said detecting that the second read-write instance of the particular pluggable database is closed;
        said restoring the particular pluggable database; and
        said updating the offline range data.

6. The method of claim 1, further comprising storing, by the container database, a current pluggable database status for the particular pluggable database and a last status change logical timestamp indicating the logical timestamp associated with a last pluggable database status change of the particular pluggable database to the current status.

7. The method of claim 6, wherein the current pluggable database status and the last status change logical timestamp are stored in a data dictionary of the container database.

8. The method of claim 1, further comprising:
    generating a first redo record indicating a status change of the particular pluggable database to "an active" status at the first logical timestamp; and
    generating a second redo record indicating a status change of the particular pluggable database to "a clean" status at the second logical timestamp.

9. The method of claim 8, further comprising:
    loading at least one backup data file associated with the particular pluggable database;
    determining that the offline range data is not current;
    processing at least one redo record associated with a redo logical timestamp in a range from a backup point associated with the at least one backup data file to the restore point, including the second redo record indicating the changing of the particular pluggable database status to the clean status; and
    updating the offline range data based on the second redo record.

10. The method of claim 9, further comprising:
    generating a checkpoint for the particular pluggable database based on the second redo record indicating the changing of the particular pluggable database status to the clean status.

11. One or more non-transitory computer-readable media storing instructions which, when executed by one or more hardware processors, cause:
    storing, by a container database, redo records for multiple pluggable databases, wherein the multiple pluggable databases include a particular pluggable database;
    in response to detecting that a first read-write instance of the particular pluggable database is opened and that no other read-write instances of the particular pluggable database are open, updating offline range data associated with the particular pluggable database to indicate that the particular pluggable database becomes active at a first logical timestamp;
    in response to detecting that a second read-write instance of the particular pluggable database is closed and that the second read-write instance was a last open read-write instance of the particular pluggable database, updating the offline range data associated with the particular pluggable database to indicate that the particular pluggable database becomes inactive at a second logical timestamp;
    restoring the particular pluggable database to a restore point based on redo records stored by the container database that are associated with a logical timestamp outside of one or more offline ranges indicated by the offline range data.

12. The one or more non-transitory computer-readable media of claim 11, wherein restoring the particular pluggable database to the restore point comprises:

loading at least one backup data file associated with the particular pluggable database; and processing at least one redo record associated with a logical timestamp in a range between a backup point associated with the at least one backup data file and the restore point, wherein redo records associated with a logical timestamp falling within an offline range indicated by the offline range data are not processed.

13. The one or more non-transitory computer-readable media of claim 11, wherein the offline range data associated with the particular pluggable database is stored in a control file of the container database.

14. The one or more non-transitory computer-readable media of claim 11, wherein the offline range data associated with the particular pluggable database is stored in file header data or other metadata for at least one data file associated with the particular pluggable database.

15. The one or more non-transitory computer-readable media of claim 11, wherein the second read-write instance of the particular pluggable database is closed abnormally, and wherein at least one other instance of the pluggable database performs:

said detecting that the second read-write instance of the particular pluggable database is closed;

said restoring the particular pluggable database; and said updating the offline range data.

16. The one or more non-transitory computer-readable media of claim 11, wherein the instructions, when executed by one or more processors, cause storing, by the container database, a current pluggable database status for the particular pluggable database and a last status change logical timestamp indicating the logical timestamp associated with a last pluggable database status change of the particular pluggable database to the current status.

17. The one or more non-transitory computer-readable media of claim 16, wherein the current pluggable database status and the last status change logical timestamp are stored in a data dictionary of the container database.

18. The one or more non-transitory computer-readable media of claim 11, wherein the instructions, when executed by one or more processors, cause:

generating a first redo record indicating the a status change of the particular pluggable database to "an active" status at the first logical timestamp; and generating a second redo record indicating a status change of the particular pluggable database to "a clean" status at the second logical timestamp.

19. The one or more non-transitory computer-readable media of claim 18, wherein the instructions, when executed by one or more processors, cause:

loading at least one backup data file associated with the particular pluggable database;

determining that the offline range data is not current;

processing at least one redo record associated with a redo logical timestamp in a range from a backup point associated with the at least one backup data file to the restore point, including the second redo record indicating the changing of the particular pluggable database status to the clean status; and updating the offline range data based on the second redo record.

20. The one or more non-transitory computer-readable media of claim 19, wherein the instructions, when executed by one or more processors, cause generating a checkpoint for the particular pluggable database based on the second redo record indicating the changing of the particular pluggable database status to the clean status.

* * * * *

UNITED STATES PATENT AND TRADEMARK OFFICE
CERTIFICATE OF CORRECTION

PATENT NO. : 9,684,566 B2
APPLICATION NO. : 14/135202
DATED : June 20, 2017
INVENTOR(S) : Li et al.

It is certified that error appears in the above-identified patent and that said Letters Patent is hereby corrected as shown below:

On the Title Page

On page 2, Column 2, under Other Publications, Line 1, delete "Administrators's" and insert -- Administrator's --, therefor.

In the Claims

In Column 16, Line 17, in Claim 8, delete ""an active"" and insert -- an active --, therefor.

In Column 16, Line 20, in Claim 8, delete ""a clean"" and insert -- a clean --, therefor.

In Column 17, Line 20, in Claim 15, delete "abnormally," and insert -- abnormally; --, therefor.

In Column 17, Line 21, in Claim 15, after "the" insert -- particular --, therefor.

In Column 18, Line 8, in Claim 18, before "a status" delete "the".

In Column 18, Lines 9-10, in Claim 18, delete ""an active"" and insert -- an active --, therefor.

In Column 18, Line 12, in Claim 18, delete ""a clean"" and insert -- a clean --, therefor.

Signed and Sealed this
Twentieth Day of February, 2018

Andrei Iancu
*Director of the United States Patent and Trademark Office*